United States Patent
Didehvar

(10) Patent No.: US 10,995,786 B2
(45) Date of Patent: May 4, 2021

(54) TENSION ROD MECHANISM

(71) Applicant: Kaveh Didehvar, Hockessin, DE (US)

(72) Inventor: Kaveh Didehvar, Hockessin, DE (US)

(*) Notice: Subject to any disclaimer, the term of this patent is extended or adjusted under 35 U.S.C. 154(b) by 459 days.

(21) Appl. No.: 16/106,849

(22) Filed: Aug. 21, 2018

(65) Prior Publication Data

US 2020/0063774 A1 Feb. 27, 2020

(51) Int. Cl.
| | |
|---|---|
| *F16B 7/14* | (2006.01) |
| *F16B 7/02* | (2006.01) |
| *F16B 7/06* | (2006.01) |
| *F16B 7/16* | (2006.01) |

(52) U.S. Cl.
CPC ............ *F16B 7/1463* (2013.01); *F16B 7/025* (2013.01); *F16B 7/06* (2013.01); *F16B 2007/16* (2013.01); *Y10T 403/32501* (2015.01)

(58) Field of Classification Search
CPC . A47H 1/022; F16B 7/025; F16B 7/06; F16B 7/1445; F16B 7/149; F16B 7/1463; F16B 2007/16; Y10T 403/32475; Y10T 403/32501
USPC ............................................ 403/109.2, 109.5
See application file for complete search history.

(56) References Cited

U.S. PATENT DOCUMENTS

| | | |
|---|---|---|
| 520,584 A | 5/1894 | Turner |
| 1,679,881 A | 8/1928 | Simpson |
| 2,661,850 A | 12/1953 | Fowler |
| 3,004,743 A * | 10/1961 | Wenger ................. F16B 7/1445 248/161 |
| 4,152,086 A * | 5/1979 | Achenbach .............. B25G 3/28 403/334 |
| D260,074 S | 8/1981 | Lewis |
| 5,433,551 A | 7/1995 | Gordon |
| 6,202,663 B1 * | 3/2001 | Uemura ................... A45B 9/00 403/109.5 |
| 6,302,614 B1 | 10/2001 | Tseng |
| D548,579 S | 8/2007 | Gaudron |
| 8,215,863 B2 * | 7/2012 | Sohn ..................... F16B 7/1463 403/109.5 |
| 8,500,357 B2 * | 8/2013 | Stahle ................... F16B 7/1463 403/109.7 |
| 8,827,587 B2 | 9/2014 | Didehvar |

(Continued)

FOREIGN PATENT DOCUMENTS

| | | | |
|---|---|---|---|
| DE | 102006008515 A1 * | 9/2007 | .............. F16B 7/149 |
| EP | 1748196 A1 * | 1/2007 | ............ F16B 7/1463 |

*Primary Examiner* — Josh Skroupa
(74) *Attorney, Agent, or Firm* — Panitch Schwarze Belisario & Nadel LLP

(57) ABSTRACT

A tension rod has an outer shaft slidably receiving an inner shaft. A tension mechanism includes a partially threaded rod with a threaded portion. A first end extends from the threaded portion and is adapted for fixing to an inner surface of the inner shaft; a second end has a tapered body with a greater transverse dimension closer to the second end. A wedge has a slot and an inner surface in facing sliding engagement with the tapered body between a nut threadedly engaged with the threaded portion and the second end. The nut is rotationally fixed to the outer shaft. Upon relative rotation of the inner and outer shafts, the nut moves along the threaded portion toward the second end, the wedge abutting and moving with the nut. The wedge contacts the tapered body, expands radially, and contacts the inner surface of the outer shaft, locking the shafts together.

20 Claims, 4 Drawing Sheets

(56) References Cited

U.S. PATENT DOCUMENTS

| | | | |
|---|---|---|---|
| 8,851,305 B2 | 10/2014 | Didehvar | |
| 8,851,435 B1* | 10/2014 | Bastien | A47H 1/022 |
| | | | 248/251 |
| 8,960,456 B2 | 2/2015 | Didehvar | |
| 9,107,529 B2 | 8/2015 | Didehvar et al. | |
| 9,388,837 B1* | 7/2016 | Hanley | F16B 7/1463 |
| 9,480,314 B2* | 11/2016 | Heim | F16B 7/1463 |
| 10,047,787 B2* | 8/2018 | Cheng | F16B 7/1463 |
| 10,070,748 B2* | 9/2018 | Hanley | A47H 1/022 |
| 10,426,287 B1* | 10/2019 | Tsai | A47H 1/022 |
| 10,844,890 B2* | 11/2020 | Daniels | F16B 7/1445 |
| 2010/0310306 A1* | 12/2010 | Wright | F16B 7/1463 |
| | | | 403/109.1 |
| 2012/0284914 A1* | 11/2012 | Bauer | A47H 1/022 |
| | | | 4/610 |
| 2014/0263123 A1 | 9/2014 | Ford | |
| 2016/0206126 A1* | 7/2016 | Ford | F16B 7/1463 |

* cited by examiner

TENSION ROD MECHANISM

BACKGROUND

The present disclosure relates to a tension rod, and in particular to a tension mechanism for joining a first shaft and a second shaft slidably received within the first shaft.

BRIEF SUMMARY

Briefly stated, a tension mechanism is provided for joining a first outer shaft and a second inner shaft of a tension rod. The first outer shaft has an inner surface, and the second inner shaft has an inner surface and an end surface. The second inner shaft is slidably received within the first outer shaft, such that the tension rod is adjustable in length. The tension rod has a longitudinal axis. The tension mechanism further comprises a partially threaded rod having a threaded portion. A first end extends from the threaded portion and is adapted to be fixed to the second inner shaft. A second end is opposite to the first end. The second end of the partially threaded rod has a tapered body with a first transverse dimension at a first point along the longitudinal axis and a second transverse dimension at a second point along the longitudinal axis. The second point is closer to the second end than to the first end, and the second transverse dimension is greater than the first transverse dimension. A nut is threadedly engaged with the threaded portion of the partially threaded rod. A wedge has an inner surface and an outer surface. The inner surface is in facing sliding engagement with the tapered body between the nut and the second end of the partially threaded rod. The wedge including a longitudinally extending slot. The nut is for being rotationally fixed to the first outer shaft so that, upon rotation of the second inner shaft with respect to the first outer shaft, the threaded portion of the partially threaded rod rotates with the second inner shaft such that the nut is moved along the longitudinal axis by the partially threaded portion toward the second end of the partially threaded rod. The wedge is in abutting engagement with the nut so upon a movement of the nut along the partially threaded rod, the wedge moves with the nut. The wedge is configured so that, upon the inner surface of the wedge contacting the tapered body as the wedge moves along the longitudinal axis from the first point to the second point, the wedge expands radially outwardly and the outer surface of the wedge makes contact with the inner surface of the first outer shaft, preventing relative movement between the first outer shaft and the second inner shaft.

BRIEF DESCRIPTION OF THE DRAWINGS

The following detailed description of embodiments of a tension rod mechanism will be better understood when read in conjunction with the appended drawings. For the purpose of illustrating the same, there is shown in the drawings an embodiment which is presently preferred. It should be understood, however, that the invention is not limited to the precise arrangements and instrumentalities shown. In the drawings.

DETAILED DESCRIPTION

Figure 1:
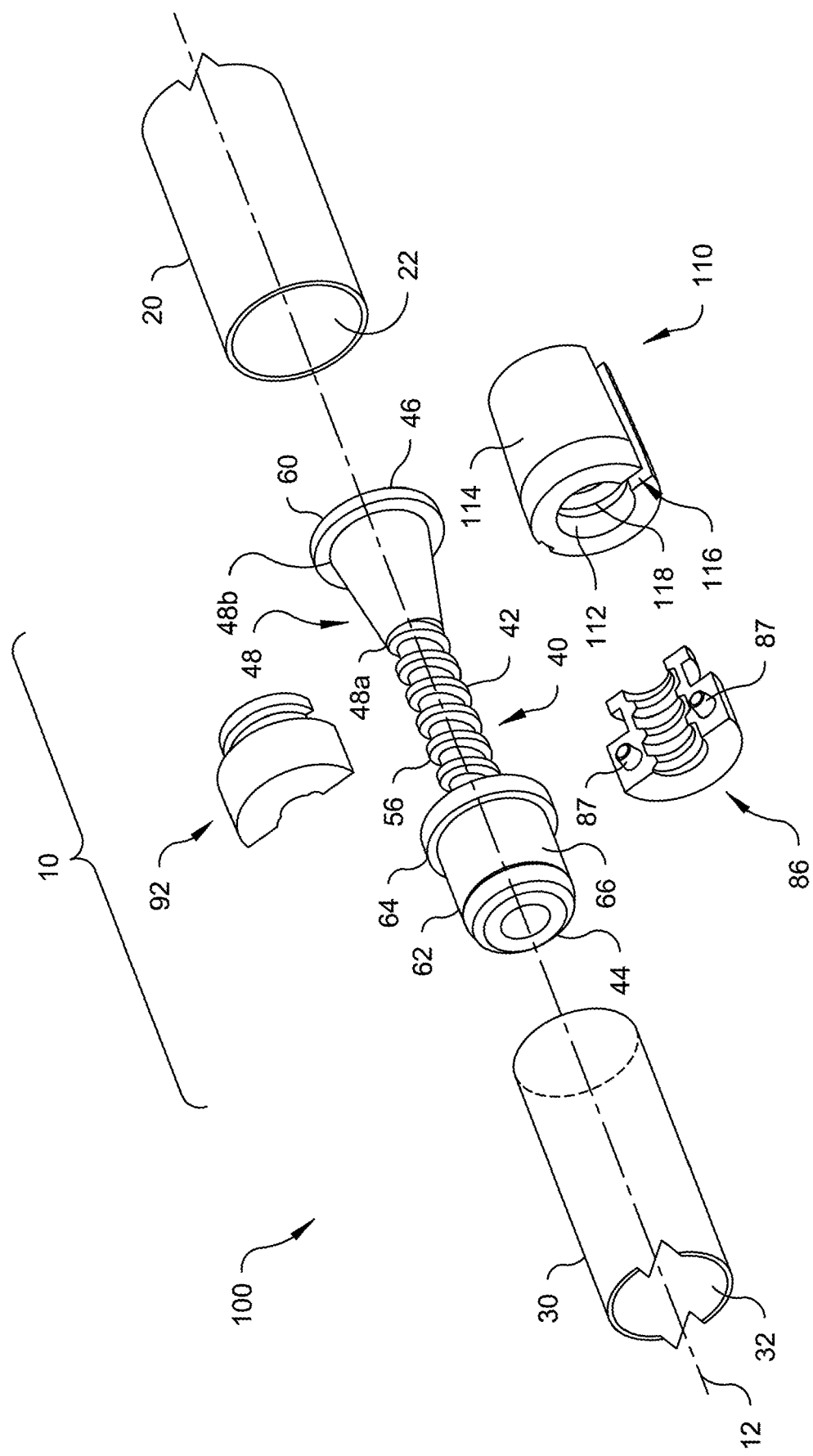
FIG. 1 is an upper front exploded perspective view of an example of a tension rod mechanism, along with portions of a first outer shaft and a second inner shaft of a tension rod to be joined by the tension rod mechanism.
Figure 2:
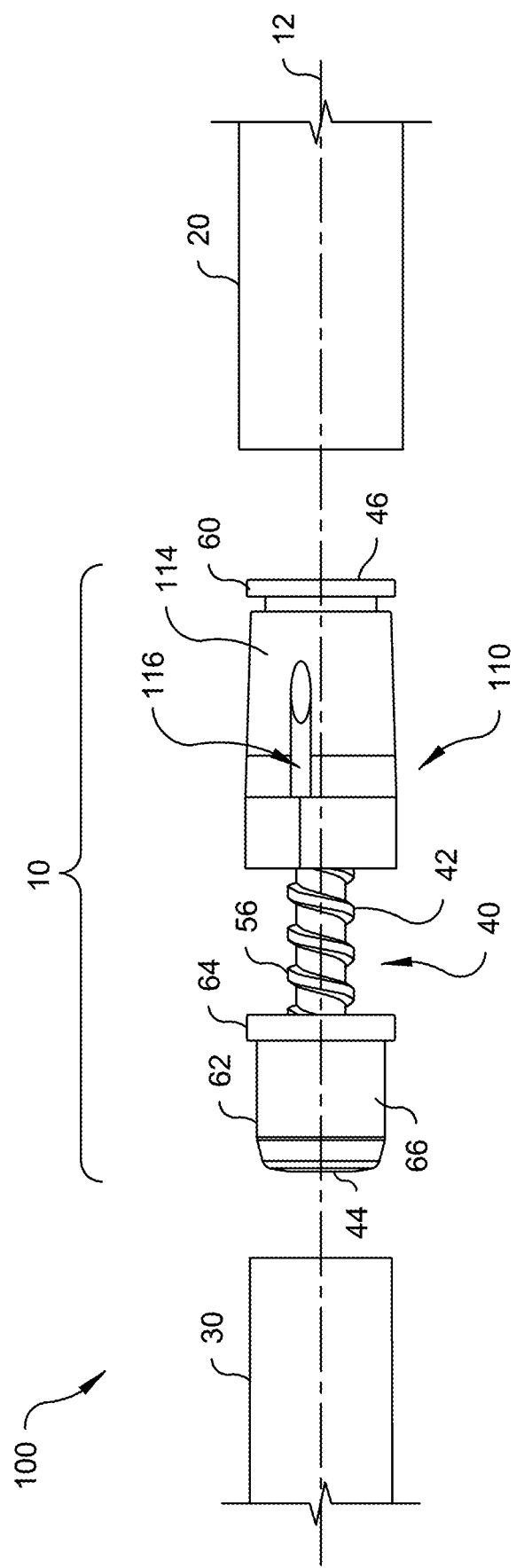
FIG. 2 is a front elevational view of the tension rod mechanism and shafts of FIG. 1.
Figure 3:
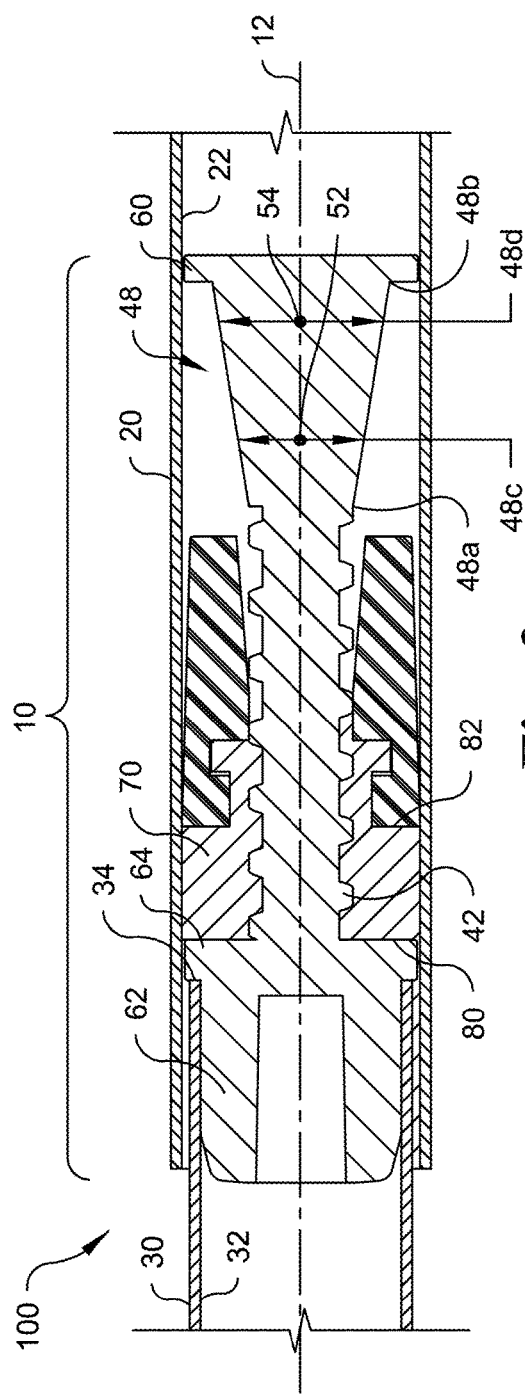
FIG. 3 is a front sectional view of the tension rod mechanism and shafts of FIG. 1, shown in a first position in which the first outer shaft an second inner shaft are movable with respect to one another.

Certain terminology is used in the following description for convenience only and is not limiting. The words "lower," "bottom," "upper," "top," "front," "back," and "rear" designate directions in the drawings to which reference is made. The words "inwardly" and "outwardly" refer to directions toward and away from, respectively, the geometric center of the component being discussed, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

Referring to FIGS. 1-4, an example of a tension rod 100 includes a tension mechanism 10 for joining a first outer shaft 20 and a second inner shaft 30 of the tension rod 100. The first outer shaft 20 has an inner surface 22, and the second inner shaft 30 has an inner surface 32 and an end surface 34. The first outer shaft 20 and the second inner shaft 30 may be made from metal, a polymeric material such as plastic, wood, or some other suitable material. The second inner shaft 30 is slidably received within the first outer shaft 20 (see FIG. 3), such that the tension rod 100 is adjustable in length. The tension rod 100 has a longitudinal axis 12, which is the example shown is common to the first outer shaft 20, the first inner shaft 30, and other elements as described below.

The tension mechanism 100 comprises a partially threaded rod 40, which may be made from metal, a polymeric material such as plastic, wood, or some other suitable material, having a threaded portion 42, which has a thread profile 56 having a constant inner and outer diameter between the first end and the second end thereof. A first end 44 extends from the threaded portion 42 and is adapted to be fixed to the second inner shaft 30. A second end 46 is opposite to the first end 44.

The first end 44 of the partially threaded rod 42 comprises a cylindrical collar 62 having an external surface 66 with an outer diameter for engaging the inner surface 32 of the second inner shaft 30 and a radially outwardly extending flange 64 with an outer diameter for engaging the end surface 34 of the second inner shaft 30.

The second end 46 of the partially threaded rod 40 has a generally frusto-conical body 48, which is tapered and has a first end 48a, a second end 48b, a first conical diameter 48c at the first end 48a, and a second conical diameter 48d at the second end 48*b*. The second conical diameter 48*d* is larger than the first conical diameter 48*c*.

As used herein, a "generally frusto-conical shape" is a truncated conical shape having a longitudinal axis, a circular cross section perpendicular to the longitudinal axis, and sloped sides. A body that deviates from a geometrically perfect frusto-conical shape by having variation in the slope of the sides, deviations of less than 10 percent, measured radially, from a perfectly circular cross-section, or a rounded end, or other minor deviations from a geometrically ideal cone shape, is "generally frusto-conical."

As used herein, a "transverse dimension" of an element at a given point is the maximum dimension of that element, measured in a plane perpendicular to a longitudinal axis of the element and passing through the given point. Thus the frusto-conical body 48 has a first transverse dimension (the first conical diameter 48*c*) at a first point 52 along the longitudinal axis 12 and a second transverse dimension (the second conical diameter 48*d*) at a second point 54 along the longitudinal axis 12. The body 48 may optionally have shapes other than frusto-conical—for example, a modified frusto-conical shape with one flat side. The second point 54 is closer to the second end 48*b* than to the first end 48*a*, and the second transverse dimension (the second conical diameter 48*d*) is greater than the first transverse dimension (the first conical diameter 48*c*). The second end 48*b* of the body 48 includes cylindrical a flange 60 having an outer diameter slidably fitted to the inner surface 22 of the first outer shaft 20. Optionally the body 48, the partially threaded rod 40, and the cylindrical collar 62 may be integrally formed as a single body without disconnectable parts.

Referring to FIGS. 1, 3-6, and 8, a nut 70 has a bore 71 and is threadedly engaged with the threaded portion 42 of the partially threaded rod 40. The nut 70 is rotationally fixed to the first outer shaft 20 so that upon rotation of the second inner shaft 30 with respect to the first outer shaft 20, the threaded portion 42 of the partially threaded rod 40 rotates with the second inner shaft 30 such that the nut 70 is moved along the longitudinal axis 12 by the partially threaded portion 42 toward the second end 46 of the partially threaded rod 40. The nut 70 optionally may have a first portion 72 having a first outer diameter 74 and a second portion 76 having a second outer diameter 78. The first outer diameter 74 may be slidably fitted to the inner surface 22 of the first outer shaft 20, and the second outer diameter 78 may be less than the first outer diameter 74. The second portion 76 may have a proximal end 80 adjacent the first portion, a distal end 82 opposite the proximal end 80, and a radially outwardly extending distal flange 84 adjacent the distal end 82 of the second portion 76. The nut 70 may optionally be formed from a first nut body 86 and a second nut body 92, which in the example shown are essentially two half-nuts. The nut 70 may be made from metal, a polymeric material such as plastic, or other suitable material. The first nut body 86 is aligned with and may be connected to the second nut body 92. The first nut body 86 has a threaded half-bore 90, and the second nut body 92 has a threaded half-bore 96. The first nut body 86 has protrusions 87 for engaging recesses 93 of the second nut body 92, to align and connect the first nut body 86 to the second nut body 92. Screws, adhesives, or a snap fit may be used instead of or in addition to the protrusions 87 and recesses 93 for aligning the first nut body 86 with the second nut body 92, connecting the first nut body 86 to the second nut body 92, or both. When connected together, the first nut body 86 and the second nut body 92 form the nut 70. The first nut body 86 and the second nut body 92 when disconnected form two openings 88, 94 permitting the threaded portion 42 of the partially threaded rod 40 to be introduced into the bore 71 of the nut 70. The first nut body 86 and the second nut body 92 need not be half-nuts; alternatively first and second nut bodies may divide the nut 70 into unequal portions.

Referring to FIGS. 1-4 and 7, a wedge has a generally frusto-conical wedge body 110 having a first end 122 with a first wedge diameter 124 and second end 126 having a second wedge diameter 128. The wedge body 110 may be made from rubber or other suitable material. The first end 122 and the second end 126 are aligned respectively with the first end 44 and the second end 46 of the partially threaded rod 40.

The wedge body 110 has an inner surface 112 and an outer surface 114. The first wedge diameter 124 is greater than the second wedge diameter 128. The inner surface 112 is in facing sliding engagement with the body 48 between the nut 70 and the second end 46 of the partially threaded rod 40. The wedge body 110 includes a longitudinally extending slot 116, which may extend the entire length of the wedge body 110, or may extend only a portion of the length of the wedge body 110. The wedge body 110 is in abutting engagement with the nut 70 so upon a movement of the nut 70 along the partially threaded rod 40, the wedge body 110 moves with the nut 70. The inner surface 112 of the wedge body 110 may optionally comprise a groove 118 for engaging the distal flange 84 of the second portion 76 of the nut 70. The wedge body 110 is configured so that, upon the inner surface 112 of the wedge body 110 contacting the body 48 as the wedge body 110 moves along the longitudinal axis 12 from the first point 52 to the second point 54, the wedge body 110 expands radially outwardly and the outer surface 114 of the wedge body 110 makes contact with the inner surface 22 of the first outer shaft 20, preventing relative movement between the first outer shaft 20 and the second inner shaft 30.

Figure 4:
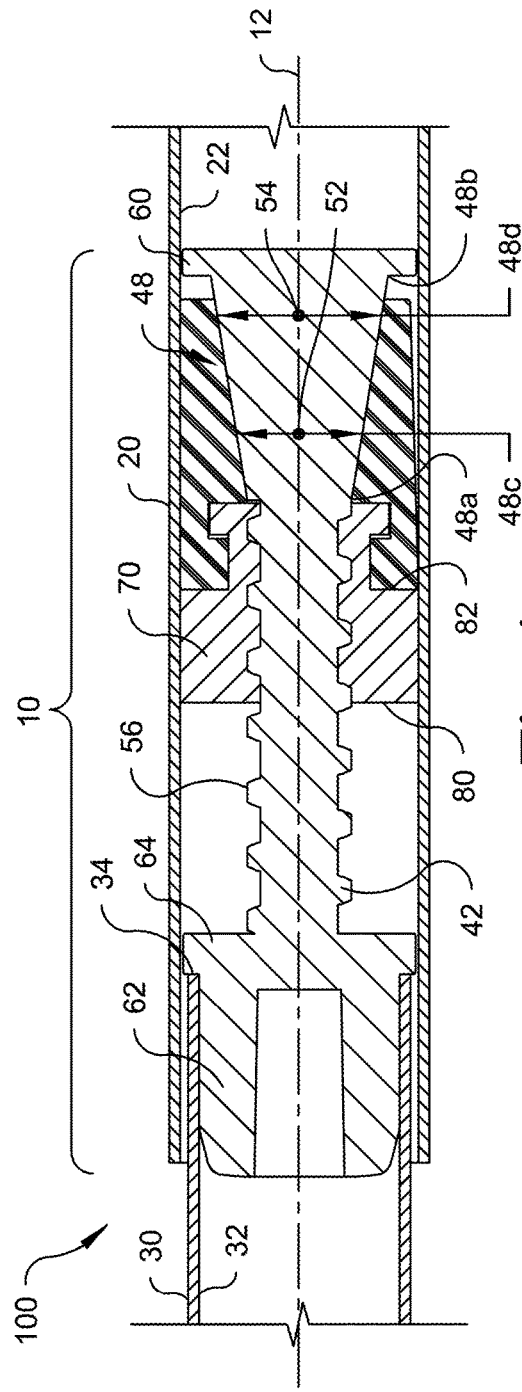
FIG. 4 is a front sectional view of the tension rod mechanism and shafts of FIG. 1, shown in a second position in which the first outer shaft and second inner shaft are secured with respect to one another.
Figure 6:
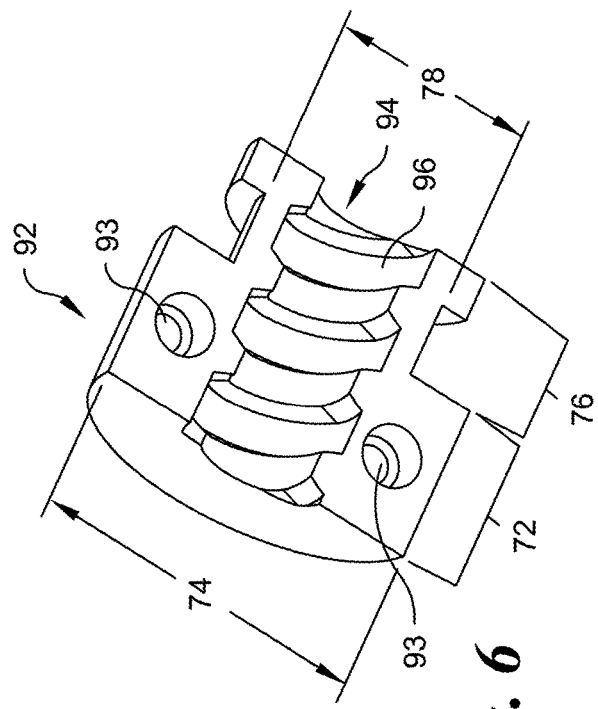
FIG. 6 is an enlarged perspective cut away view of the second nut body portion of the tension rod mechanism of FIG. 1 showing the interior thereof.
Figure 8:
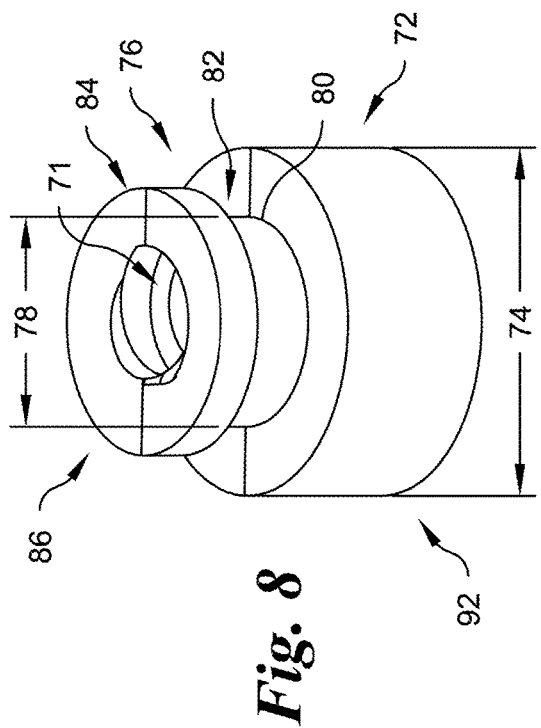
FIG. 8 is a right upper perspective view of a nut of the tension rod mechanism of FIG. 1.
Figure 5:
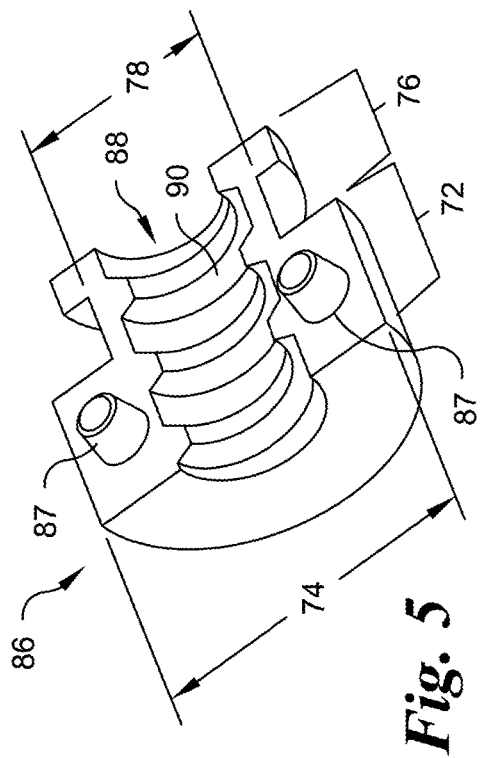
FIG. 5 is an enlarged perspective cut away view of a first nut body portion of the tension rod mechanism of FIG. 1 showing the interior thereof.
Figure 7:
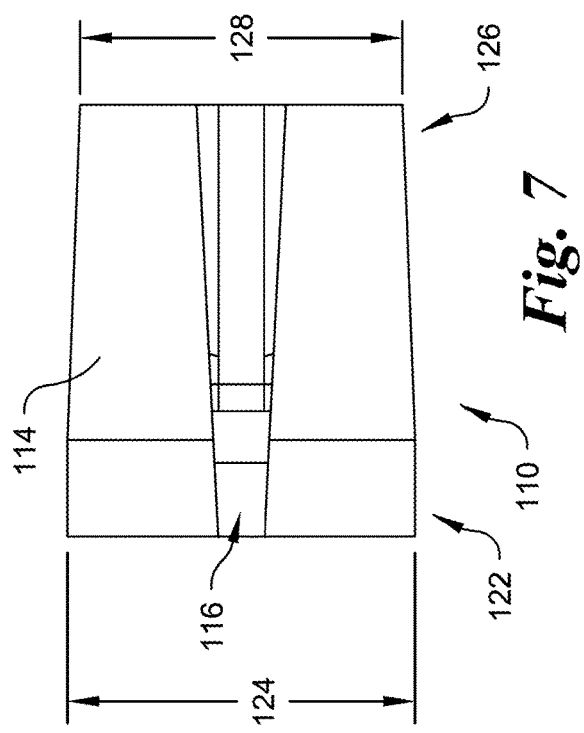
FIG. 7 is an elevational view of a wedge of the tension rod mechanism of FIG. 1.

In use, the tension rod 100 may be initially assembled with the tension mechanism 10 in an initial (or starting) configuration in which the nut 70 abuts or is proximate to the first end 44 of the partially threaded rod 42, where the collar 62 is located. See FIG. 3. The initial configuration allows the first outer shaft 20 and the second inner shaft 30 to slide telescopically relative to each other along the longitudinal axis 12. A user thus adjusts a length of the tension rod 100 by sliding the first outer shaft 20 and the second inner shaft 30 with respect to one another along the longitudinal axis 12 until the tension rod 100 is level between two support surfaces (not shown), with the ends (not shown) of the tension rod in contact with the two support surfaces. When the desired length is reached, the first outer shaft 20 and the second inner shaft 30 are rotated with respect to one another in a first direction, which causes the nut 70 to rotate with respect to the threaded portion 42 of the rod 22, such that the nut 70 and the wedge body 110 move away from the first end 44 of the partially threaded rod 40 and toward the second end 46 and the generally frusto-conical body 48 of the partially threaded rod 40, as shown in FIG. 4. As the wedge body 110 moves along the generally frusto-conical body 48, the wedge body 110 expands and applies an outwardly-directed radial force to the first outer shaft 20, thus creating tension which locks the position of the second inner shaft 30 relative to the first outer shaft 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

I claim:

1. A tension mechanism for joining a first outer shaft and a second inner shaft of a tension rod, the first outer shaft having an inner surface and the second inner shaft having an inner surface and an end surface, the second inner shaft being slidably received within the first outer shaft, such that the tension rod is adjustable in length, the tension rod having a longitudinal axis, the tension mechanism comprising:
  a partially threaded rod having a threaded portion and a first end extending from the threaded portion and adapted to be fixed to the second inner shaft and a second end opposite thereto, the second end of the partially threaded rod having a tapered body with a first transverse dimension at a first point along the longitudinal axis and a second transverse dimension at a second point along the longitudinal axis, the second point being closer to the second end than to the first end, and the second transverse dimension being greater than the first transverse dimension;
  a nut threadedly engaged with the threaded portion of the partially threaded rod;
  a wedge having an inner surface and an outer surface, the inner surface being in facing sliding engagement with the tapered body between the nut and the second end of the partially threaded rod, the wedge including a longitudinally extending slot,
  the nut for being rotationally fixed to the first outer shaft so that upon rotation of the second inner shaft with respect to the first outer shaft, the threaded portion of the partially threaded rod rotates with the second inner shaft such that the nut is moved along the longitudinal axis by the partially threaded portion toward the second end of the partially threaded rod,
  the wedge being in abutting engagement with the nut so upon a movement of the nut along the partially threaded rod, the wedge moves with the nut,
  the wedge being configured so that, upon the inner surface of the wedge contacting the tapered body as the wedge moves along the longitudinal axis from the first point to the second point, the wedge expands radially outwardly and the outer surface of the wedge makes contact with the inner surface of the first outer shaft, preventing relative movement between the first outer shaft and the second inner shaft to lock the position of the first outer shaft with respect to the second inner shaft.

2. The tension mechanism of claim 1, wherein the threaded portion of the partially threaded rod has a thread profile having a constant inner and outer diameter between the first end and the second end thereof.

3. A tension rod having a longitudinal axis, the tension rod comprising:
  a first outer shaft having an inner surface;
  a second inner shaft having an inner surface and an end surface, the second inner shaft being slidably received by the first outer shaft, such that the tension rod is adjustable in length;
  a tension mechanism according to claim 2 joining the first outer shaft to the second inner shaft.

4. The tension mechanism of claim 1, wherein the tapered body is a generally frusto-conical body having a first end and a second end and having a first conical diameter at the first end thereof and a second conical diameter at the second end thereof, the second conical diameter being larger than the first conical diameter.

5. A tension rod having a longitudinal axis, the tension rod comprising:
  a first outer shaft having an inner surface;
  a second inner shaft having an inner surface and an end surface, the second inner shaft being slidably received by the first outer shaft, such that the tension rod is adjustable in length;
  a tension mechanism according to claim 4 joining the first outer shaft to the second inner shaft.

6. The tension mechanism of claim 1, wherein the second end of the tapered body includes a flange configured to be slidably fitted to the inner surface of the first outer shaft.

7. A tension rod having a longitudinal axis, the tension rod comprising:
  a first outer shaft having an inner surface;
  a second inner shaft having an inner surface and an end surface, the second inner shaft being slidably received by the first outer shaft, such that the tension rod is adjustable in length;
  a tension mechanism according to claim 6 joining the first outer shaft to the second inner shaft.

8. The tension mechanism of claim 1, wherein the first end comprises a cylindrical collar having an external surface for engaging the inner surface of the second inner shaft and a radially outwardly extending flange for engaging the end surface of the second inner shaft.

9. A tension rod having a longitudinal axis, the tension rod comprising:
  a first outer shaft having an inner surface;
  a second inner shaft having an inner surface and an end surface, the second inner shaft being slidably received by the first outer shaft, such that the tension rod is adjustable in length;
  a tension mechanism according to claim 8 joining the first outer shaft to the second inner shaft.

10. The tension mechanism of claim 1, wherein the nut has a first portion having a first outer diameter and a second portion having a second outer diameter, the first outer diameter configured to be slidably fitted to the inner surface of the first outer rod, the second outer diameter being less than the first outer diameter, and
  wherein the second portion has a proximal end adjacent the first portion, a distal end opposite the proximal end, and a distal flange adjacent the distal end of the second portion, and
  wherein the inner surface of the wedge comprises a groove for engaging the distal flange.

11. A tension rod having a longitudinal axis, the tension rod comprising:
  a first outer shaft having an inner surface;
  a second inner shaft having an inner surface and an end surface, the second inner shaft being slidably received by the first outer shaft, such that the tension rod is adjustable in length;
  a tension mechanism according to claim 10 joining the first outer shaft to the second inner shaft.

12. The tension mechanism of claim 1, wherein the wedge has a generally frusto-conical wedge body having a first end having a first wedge diameter and second end having a second wedge diameter, the first end and the second end being aligned respectively with the first end and the second end of the partially threaded rod, with the first wedge diameter being greater than the second wedge diameter.

13. A tension rod having a longitudinal axis, the tension rod comprising:
  a first outer shaft having an inner surface;

a second inner shaft having an inner surface and an end surface, the second inner shaft being slidably received by the first outer shaft, such that the tension rod is adjustable in length;

a tension mechanism according to claim 12 joining the first outer shaft to the second inner shaft.

14. The tension mechanism of claim 1, wherein the nut has a bore and is formed from a first nut body connected to a second nut body, the first nut body and the second nut body when connected together forming the nut, and the first nut body and the second nut body when disconnected forming an opening permitting the threaded portion of the partially threaded rod to be introduced into the bore of the nut.

15. The tension mechanism of claim 14, wherein the tapered body, the partially threaded rod, and a cylindrical collar are integrally formed as a single body without disconnectable parts.

16. A tension rod having a longitudinal axis, the tension rod comprising:

a first outer shaft having an inner surface;

a second inner shaft having an inner surface and an end surface, the second inner shaft being slidably received by the first outer shaft, such that the tension rod is adjustable in length;

a tension mechanism according to claim 15 joining the first outer shaft to the second inner shaft.

17. A tension rod having a longitudinal axis, the tension rod comprising:

a first outer shaft having an inner surface;

a second inner shaft having an inner surface and an end surface, the second inner shaft being slidably received by the first outer shaft, such that the tension rod is adjustable in length;

a tension mechanism according to claim 14 joining the first outer shaft to the second inner shaft.

18. The tension mechanism of claim 1, wherein the tapered body, the partially threaded rod, and a cylindrical collar are integrally formed as a single body without disconnectable parts.

19. A tension rod having a longitudinal axis, the tension rod comprising:

a first outer shaft having an inner surface;

a second inner shaft having an inner surface and an end surface, the second inner shaft being slidably received by the first outer shaft, such that the tension rod is adjustable in length;

a tension mechanism according to claim 18 joining the first outer shaft to the second inner shaft.

20. A tension rod having a longitudinal axis, the tension rod comprising:

a first outer shaft having an inner surface;

a second inner shaft having an inner surface and an end surface, the second inner shaft being slidably received by the first outer shaft, such that the tension rod is adjustable in length;

a tension mechanism according to claim 1 joining the first outer shaft to the second inner shaft.

\* \* \* \* \*